Jan. 13, 1970  C. P. CREIGHTON  3,489,491
CORNEAL CONTACT LENS WITH HYDROPHILIC MARGINAL RIM PORTION
Filed Dec. 1, 1966

INVENTOR.
CHARLES PATRICK CREIGHTON
BY
Christel & Bean
ATTORNEYS

United States Patent Office 3,489,491
Patented Jan. 13, 1970

3,489,491
CORNEAL CONTACT LENS WITH HYDROPHILIC MARGINAL RIM PORTION
Charles Patrick Creighton, 13305 Broadway, Alden, N.Y. 14004
Filed Dec. 1, 1966, Ser. No. 598,464
Int. Cl. G02g 7/04
U.S. Cl. 351—160                        1 Claim

ABSTRACT OF THE DISCLOSURE

A contact lens wherein the main body portion is of hydrophilic plastic material and has a marginal ledge in its posterior surface which receives a layer of hydrophilic plastic material which is bonded to the surface of the ledge. The interior surface of the marginal portion of the lens is of continuous spherical form across the joinder between the marginal hydrophilic plastic material and the hydrophobic body portion of the lens which lies immediately adjacent to such marginal portion.

---

The present invention generally relates to a new contact lens for correcting visual deficiencies with a minimum of physical irritation to the eye and without interfering with the normal physiology and metabolic processes of the cornea and adnexa, and to a method of making such a lens.

Particularly, the invention uses a hydrophilic plastic marginal edge portion bonded to a hydrophobic plastic central portion to reduce or eliminate the physical discomfort that wearers routinely experience with corneal contact lenses made entirely of hydrophobic plastic, such as methyl methacrylate.

The central portion of the lens, made from hydrophobic plastic, provides true optical corrective surfaces required to correct the wearer's visual deficiency.

Suitable hydrophilic plastics, referred to generally as glyceryl methacrylate hydrogels, comprise three-dimensional networks of hydrophilic polymers which may be prepared by various methods. One such material is polydioxethylene methacrylate. The soft marginal edge portion of this hydrophilic plastic material allows the eye to adapt instantly to the physical presence of the contact lens without a prolonged adaptation period and without the physical irritation that accompanies the wearing of a contact lens made entirely of hydrophobic plastic. The presence of the natural tear fluid maintains the hydrophilic plastic in the hydrated condition, which is a soft and yielding state, when the contact lens is in position on the eye.

The central portion which consists of hydrophobic plastic is impervious to the tears of the eye and, therefore, remains in the hard state. It does not undergo hydration and become soft, as does the hydrophilic marginal portion when the contact lens is worn on the eye. Thus, the radii of curvature of the anterior and posterior surfaces of the central hydrophobic portion of the contact lens remain constant, and allow the prescription power of the contact lens on the eye to remain constant. Consequently, the visual acuity remains at a constant level.

Figure 3:
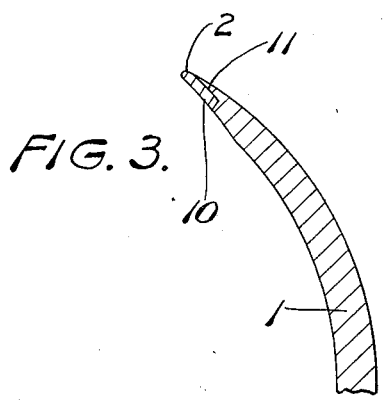
FIG. 3 is an enlarged fragmentary cross-sectional view of the peripheral portion of the lens of FIG. 1 illustrating the hydrophilic plastic and the hydrophobic plastic portions thereof.

The present invention comprises a contact lens which has a concavo-convex body made from two basically different types of synthetic resin. Referring to FIG. 3 the central portion 1 of the lens is made from hydrophobic plastic; whereas the peripheral portion 2 is made from hydrophilic plastic. The junction 11 can be bonded in any manner such as with epoxy cement, by ultrasonic means, or by polymerization, that is, by a direct bonding of the two types of plastic.

The hydrophobic plastic core 1 is curved at its posterior surface to fit the curvature of the eye and allow for proper tear circulation, as at 3, with the usual flatter peripheral radius 10 on the marginal portion of the posterior lens surface to facilitate tear entry. The radius of curvature of the anterior surface is determined by prescribed optical requirements.

Figure 1:
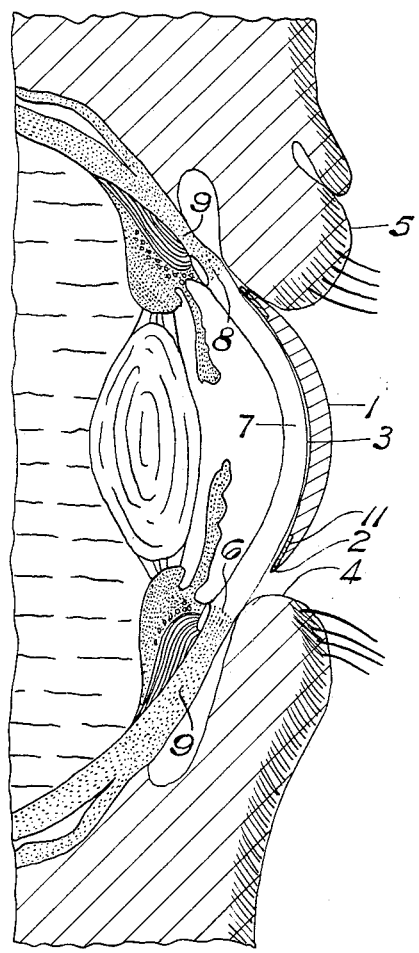
FIG. 1 is a cross-sectional view of the anterior portion of the human eye illustrating one form of the contact lens of the present invention in position relative to the cornea and to the upper and lower lid.
Figure 2:
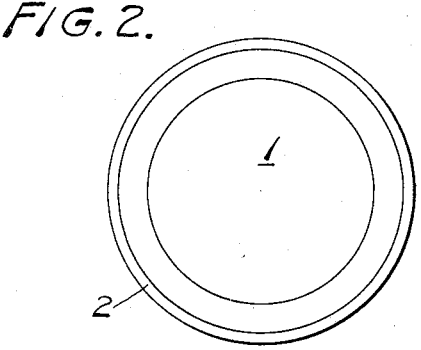
FIG. 2 is a front elevational view of the contact lens of FIG. 1.

Referring to FIG. 1, a contact lens with the hydrophilic annular periphery 2 offers less physical sensation to the upper lid 5 and the cornea 7 when the eye is in a straight-forward position of gaze as in FIG. 1 than that of a conventional hydrophobic plastic lens. Also, the hydrophilic periphery offers less physical sensation to the lids and cornea during eye excursions and during the normal reflex blink cycle.

The width of the hydrophilic plastic collar 2 can be varied so that the total diameter of the lens may exceed the diameter of the cornea at the limbal limits 6 and 8, and rest upon the sclera 9 of the eye.

Figure 5:
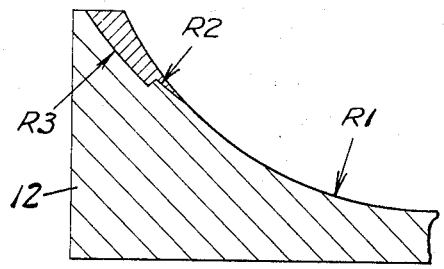
FIG. 5 is a view similar to FIG. 4 showing a succeeding step in the method of the present invention.

A preferred procedure for making the contact lens of the present invention is to fabricate a hydrophobic plastic button 12 and bond the hydrophilic plastic to the button. As illustrated in FIG. 5 a central radius $R_1$ is lathe cut is conventional manner and a second radius $R_2$ is lathe cut after formation of radius $R_1$.

A third radius $R_3$ is then formed in the hydrophobic plastic button to provide a seat for the hydrophilic plastic which forms the edge portion 2 of the finished contact lens.

Figure 4:
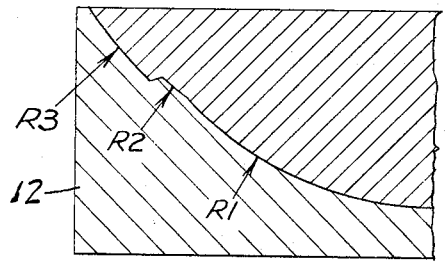
FIG. 4 is a fragmentary axial cross sectional view of a hydrophobic plastic button lathe—turned to form a posterior lens surface and having hydrophylic plastic bonded thereto.

The hydrophobic button thus formed is then filled with hydrophilic plastic as shown in FIG. 4 which sets in place and bonds to the surfaces $R_1$, $R_2$ and $R_3$.

While the hydrophilic plastic is in the dehydrated state, the central radius $R_1$ is again lathe cut at the same depth as when the initial radius $R_1$ was cut.

Figure 6:
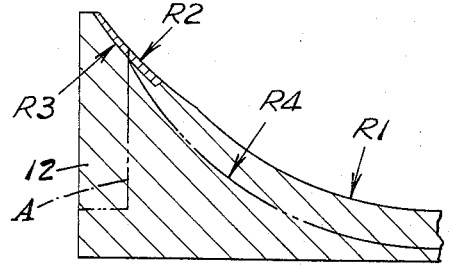
FIG. 6 is a view similar to FIGS. 4 and 5 showing a still further step in the present method.

On the posterior lens surface the depth of the cut of the second radius $R_2$ is the same as described above, which forms the surface 10 of FIG. 3. This leaves hydrophilic plastic only in the ledge formed by radius $R_3$. But, the peripheral surface portion of the second radius of curvature $R_2$ is now hydrophilic plastic as illustrated in FIG. 6. The dotted curve $R_4$ in this figure represents the front surface radius $R_4$.

The dotted line A indicates the reduction in the diameter of the molded plastic button to approximate the finished lens diameter (chord). The diameter reduction is completed before the front surface radius $R_4$ is lathe cut. In FIG. 6 the dot and dash line are $R_4$ illustrates the finished front surface of the lens.

While the hydrophilic plastic is in the dehydrated state, the button is lathe cut and polished to the final specifications. The edge is also finished as shown in FIG. 3 while the peripheral collar is in the dehydrated state.

If the lens is immersed in a saline solution before it is placed on the cornea, the hydrophilic plastic marginal portion 2 will be transformed from the dehydrated (hard) state to the hydrated (soft) state. However the lens can be placed directly on the cornea in the dry state and the tears of the eye will transform the hydrophilic marginal portion to the hydrated state. Where hydration is effected in the saline solution before it is placed on the cornea the patient will have the immediate advantage of the soft periphery, rather than tolerating the hard edge portion until it becomes fully hydrated and soft. During wearing periods the lens periphery will remain fully hydrated and soft due to the normal tear flow of the eye. However, the hydrophobic portion of the lens is impervious to the tears of the eye and will remain dehydrated and in a hard state.

For the purposes of illustration the drawing shows a simple spherical unifocal non-prismatic lens but it is to be understood that the various optical corrective formations which are available in contact lenses generally may be provided. Thus the lens surfaces may be bifocal, may be formed with prism correction, may be formed with a toric posterior surface when the cornea is toric and may be formed with any desired astigmatic corrective formations.

The hydrophilic collar 2 has been illustrated as a continuation of the secondary radius $R_2$ on the posterior surface of the lens for purposes of example, but the lens may be fabricated so that the entire secondary radius $R_2$ on the posterior surface is of hydrophilic plastic. The junction of the central radius $R_1$ and the secondary radius $R_2$ would then define the transition zone between the hydrophilic plastic portion 2 and the hydrophobic plastic body portion 1.

The hydrophilic plastic marginal portion 2 may be substantially wider in a radial direction than in the illustrated example, if desired, by increasing the overall diameter (chord) of the lens.

If desired, the body portion of the contact lens may be fenestrated, that is, provided with small apertures where clinical design indicates that fenestration is necessary. The plastic material may be tinted as required, either for optical or cosmetic reasons.

The hydrophilic collar has been illustrated as a continuous annulus of three-hundred and sixty degrees but the hydrophilic marginal portion may be restricted to a sector of the periphery of the contact lens. Using prism for ballast or for meridional orientation, the hydrophilic sector would lie at the apex of the prism, and on the eye would position itself at the upper lid region. To allow adequately for comfortable upper lid action, as during the reflex blink cycle when the upper lid passes over the edge of the lens, the hydrophilic sector should occupy an angle of one-hundred and twenty degrees.

The hydrophilic marginal portion may be interrupted at specific intervals by extensions of the hydrophobic plastic from the central portion of the lens. Such extensions would be continuous from the center to the edge of the lens. Upon hydration, the hydrophilic plastic will expand and curl resulting in minute elevations in these sections which facilitate the natural tear circulation beneath the lens. The elevated soft hydrophilic segments will thus provide comfortable lid action during blink cycles.

An alternative method of making the contact lens of the present invention comprises omitting the steps of first forming the radii $R_1$ and $R_2$ in the hydrophobic button blank. According to this alternative an annular groove is cut in the top face of the button, the bottom of the groove corresponding to the radius $R_3$. This groove is then filled with hydrophilic plastic material which bonds to the walls of the annular groove, particularly to the arcuate surface defined by the radius $R_3$. The radii $R_1$ and $R_2$ are then lathe cut in the same manner as in converting the button from the form illustrated in FIG. 4 to that illustrated in FIG. 5.

A still further alternative method consists in forming a complete contact lens of hydrophobic plastic material but including the marginal recess defined by the radius $R_3$, then placing this lens between a pair of glass mold parts which match the radii $R_1$, $R_2$ and $R_4$ and pouring hydrophilic plastic in the space left between the male mold part and radius $R_3$. In this latter method the hydrophilic material may be molded in place before the button has been lathe cut to form the anterior radius $R_4$, in which case only one mold part bearing the radii $R_1$ and $R_2$ will be required.

Minor changes in the construction and fabrication of the hydrophobic central portion and the hydrophilic periphery will suggest themselves and may be resorted to without departing from the spirit of invention. The advantages of the invention will have been clearly understood from the foregoing detailed description of the illustrated preferred embodiment.

Reference is made earlier herein to methyl methacrylate as an example of a hydrophobic plastic which is commonly used in manufacturing contact lenses, the entire lens being of methyl methacrylate resin. Other hydrophobic plastic materials having the required rigidity and the required optical properties may be employed for the optical body portion 1 of the lens of the present invention. Also reference is made earlier herein to glyceryl methacrylate hydrogel as a suitable hydrophilic plastic material for the marginal portions of the present composite contact lenses. Here again, any other hydrophilic synthetic resin having similar physical properties in both the dry and hydrated states may be employed. The gist of the present invention is the novel combination in a composite contact lens of a hydrophobic relatively rigid plastic central body portion with a hydrophilic plastic rim portion which softens upon hydration.

I claim:

1. A unitary corneal contact lens having a central body portion of hydrophobic plastic material, a marginal ledge in the posterior surface of said body portion, and a layer of hydrophilic plastic material bonded to the surfaces of said ledge, the interior surface of the outer marginal portion of said lens comprising a continuous spherical surface across the joinder between the interior surface of said body portion and the contiguous interior surface of said layer of hydrophilic plastic material at such margin, said layer of hydrophilic plastic material extending slightly beyond the hydrophobic plastic body portion to present a rounded edge of hydrophilic plastic material, the exterior surface of said body portion and the projecting surface of said layer of hydrophilic plastic material forming a continuous spherical exterior lens surface, said ledge and said hydrophilic plastic layer being of sufficient thickness so that the entire rounded edge portion of said lens and a narrow marginal edge at the exterior surface of said lens comprise hydrophilic plastic to minimize discomfort due to engagement of the eyelid with such edge portion.

References Cited

UNITED STATES PATENTS

| | | | |
|---|---|---|---|
| 2,015,241 | 9/1935 | Singer | 351—165 |
| 2,240,157 | 4/1941 | Gagnon et al. | 351—160 |
| 2,241,415 | 5/1941 | Moulton | 351—162 |
| 2,976,576 | 3/1961 | Wichterle et al. | 351—160 X |
| 3,168,741 | 2/1965 | Belgard. | |
| 3,220,960 | 11/1965 | Wichterle et al. | 351—160 X |

FOREIGN PATENTS

| | | |
|---|---|---|
| 1,327,193 | 4/1963 | France. |
| 167,273 | 12/1950 | Austria. |
| 222,917 | 2/1958 | Australia. |
| 45,857 | 2/1966 | Germany. |

DAVID H. RUBIN, Primary Examiner

U.S. Cl. X.R.

264—1; 351—177

PO-1050
(5/69)

UNITED STATES PATENT OFFICE
CERTIFICATE OF CORRECTION

Patent No. 3,489,491                   Dated   January 13, 1970

Inventor(s)    Charles Patrick Creighton

It is certified that error appears in the above-identified patent
and that said Letters Patent are hereby corrected as shown below:

In the "Abstract of the Disclosure", line 2, the
word "hydrophilic" should read -- hydrophobic --.

SIGNED AND
SEALED
JUN 23 1970

(SEAL)
Attest:

Edward M. Fletcher, Jr.
Attesting Officer

WILLIAM E. SCHUYLER, JR.
Commissioner of Patents